| United States Patent [19] | [11] Patent Number: 4,587,590 |
|---|---|
| Bala et al. | [45] Date of Patent: May 6, 1986 |

[54] MICROCOMPUTER DRIVEN FAIL-SAFE DEVICE WITH SHORT CIRCUIT DETECTION FOR ELECTRONIC CONTROL CIRCUITRY

[75] Inventors: John L. Bala, Amherst, N.H.; Michael McCarron, Medford; Richard E. Zapolin, Lexington, both of Mass.

[73] Assignee: Electronics Corporation of America, Cambridge, Mass.

[21] Appl. No.: 580,475

[22] Filed: Feb. 15, 1984

[51] Int. Cl.[4] .............................................. H02H 3/093
[52] U.S. Cl. ....................................... 361/94; 361/96; 361/97; 364/483
[58] Field of Search ....................... 361/92, 31, 33, 96, 361/94, 97, 111; 364/483, 492; 307/200 A

[56] References Cited

U.S. PATENT DOCUMENTS

| 4,395,224 | 7/1983 | Cade | 431/31 |
|---|---|---|---|
| 4,395,638 | 7/1983 | Cade | 250/554 |
| 4,398,233 | 8/1983 | Bala et al. | 361/78 |
| 4,419,619 | 12/1983 | Jindrick et al. | 364/483 X |
| 4,439,804 | 3/1984 | Riddle et al. | 361/92 |
| 4,466,074 | 8/1984 | Jindrick et al. | 364/483 X |

Primary Examiner—Harry E. Moose, Jr.
Attorney, Agent, or Firm—Charles E. Pfund

[57] ABSTRACT

A fail-safe device for removing power from controlled circuitry upon the occurrence of an undesired operating condition is disclosed. The fail-safe device includes means for detecting a short circuit in the controlled circuitry and for indicating the existence of an undesired operating condition if a short is detected. The fail-safe device further includes a non-volatile memory for retaining data through a power outage so that the existence of an undesired operating condition is remembered upon return of the power. The data stored in the non-volatile memory may also be useful in investigating an accident or malfunction. The fail-safe device still further includes a reset button which returns power after an undesired operating condition if it is momentarily depressed.

21 Claims, 1 Drawing Figure

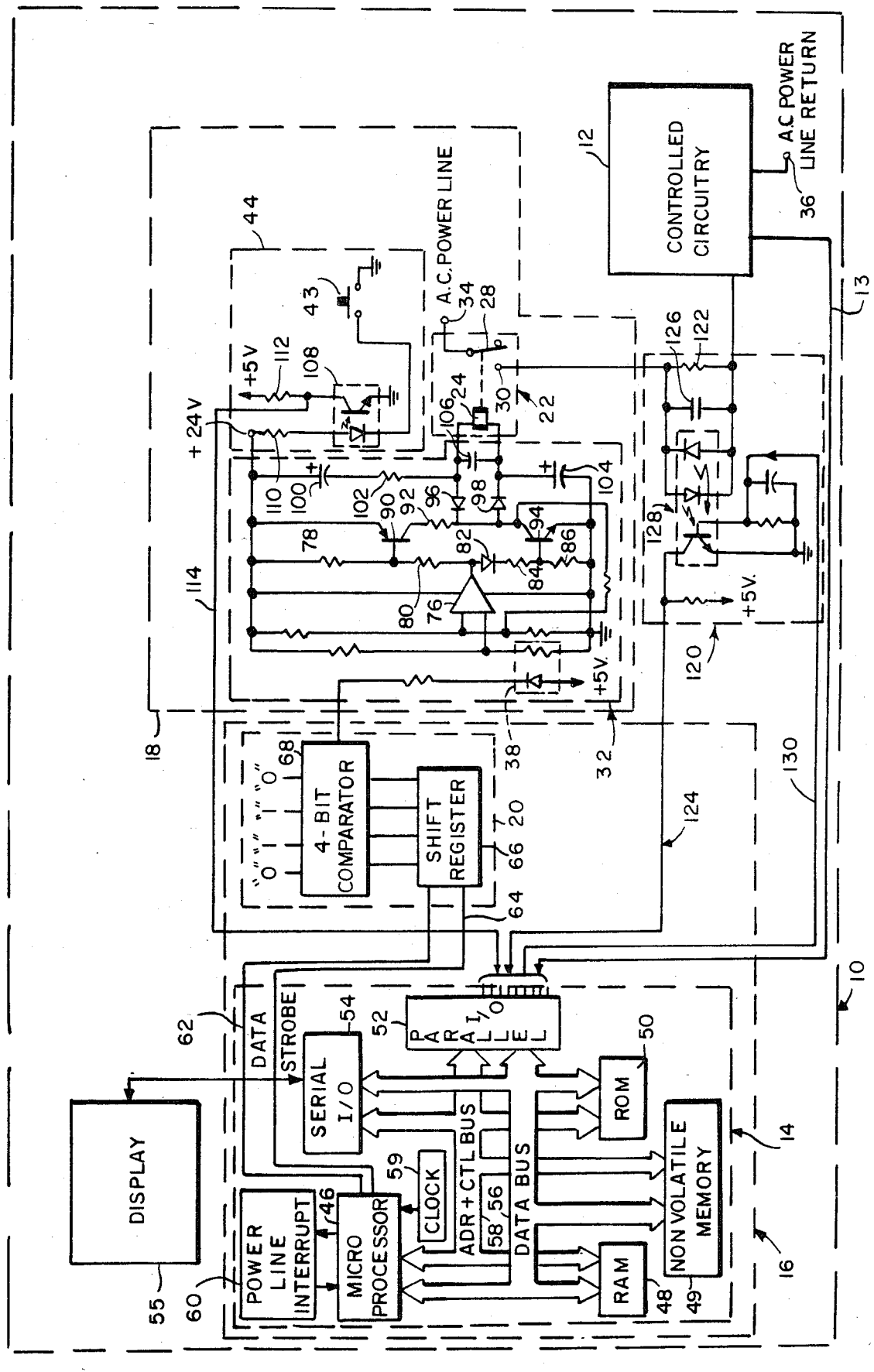

MICROCOMPUTER DRIVEN FAIL-SAFE DEVICE WITH SHORT CIRCUIT DETECTION FOR ELECTRONIC CONTROL CIRCUITRY

BACKGROUND OF THE INVENTION

This invention relates to fail-safe devices for electronic control circuits of the type described in Bala et al. U.S. Pat. No. 4,398,233 and having the same assignee as the present application.

The use of electronic control circuits is widespread in the prior art and is becoming even more wide spread as the cost and size of electronic components decreases and the power of these components increases. Such circuits have been used to control devices as varied as microwave ovens, industrial robots, chemical processing facilities, industrial furnaces, medical life support systems, and spacecraft, such as the Space Shuttle. As the responsibility entrusted to such circuits increases, so does the need that such circuits be fail-safe. For example, if the control circuit of a large industrial furnace used in an electric power plant fails to cut off the supply of fuel to the burner of that furnace after its flame has gone out, an explosion could result that would do millions of dollars worth of property damage and that could kill many lives. Thus, it is important to design electronic control circuitry in such a way so that if it should fail it will do so in a manner that is safe.

A fail-safe control circuit is disclosed in Bala et al. U.S. Pat. No. 4,398,233 which controls the power to controlled circuitry by only providing power when a fail-safe signal is within a predetermined frequency range. If the circuitry generating the fail-safe signal should fail, the frequency of this signal would likely differ from the predetermined frequency range and the power would be turned off. A microprocessor is provided for monitoring the operating conditions. If an undesirable operating condition should arise, the microprocessor would cause the fail-safe device to lock out power from the control circuitry. However, if there was a temporary external power loss, the microprocessor's memory of the undesirable operating condition would be lost. Upon return of the external power the microprocessor will operate from a clean slate and supply power to controlled circuitry even if there was an undesirable operating condition present prior to the power shut off. This could lead to a dangerous or even catastrophic event.

Furthermore, if a short circuit was present in the controlled circuitry, the etching on the circuit boards of the fail-safe device could get damaged when power is turned on thereby disabling the device. Still further a negligent use could defeat the fail-safe features by continually holding or jamming in the reset button.

SUMMARY OF THE INVENTION

This invention is directed to a fail-safe device containing a non-volatile memory and short circuit detection circuitry. The non-volatile memory is advantageously used to recall undesired operating conditions even when the external power goes out. Thus, any time an undesired operating condition causes the fail-safe circuitry to lockout power to the electronically controlled circuits, it is necessary to manually activate a reset circuit to restore power. The non-volatile memory also makes possible the collection of data which may be useful in determining the cause of an unsafe condition which resulted in damage. The non-volatile memory records the occurences of lockouts, the causes for said lockouts and the time that they occurred, among other things. Thus, should there be an explosion investigators could review the data stored in the non-volatile memory, thereby significantly aiding their investigation.

Short circuit detection means is provided including a heat limiting device and means for shunting current away from the heat limiting device. The heat limiting device has a resistance that limits the current when a high surge of current is sent through it and its resistance decreases substantially as it heats up from the current surge. The shunt device receives current only during the initial high current inrush under normal operating conditions. If there is a short circuit in the controlled circuitry, the current through the heat current limiting device would remain high and current would continue to be sent to the shunt device. The shunt device sends a signal to the microprocessor when it is receiving current. If the signal to the microprocessor is received for more than a predetermined time limit, an undesired operating condition is indicated. The microprocessor will cause the fail-safe circuitry to lockout the power from the controlled circuitry to prevent damage which could be caused by the short circuit. The microprocessor also records the occurence of the lockout and that the cause was a short circuit in the controlled circuitry.

BRIEF DESCRIPTION OF THE DRAWING

The FIGURE is a schematic diagram of a microcomputer driven fail-safe device according to the present invention.

DETAILED DESCRIPTION OF THE PREFERRED EMBODIMENT

The disclosure of Bala et al. U.S. Pat. No. 4,398,233 is incorporated by reference herein.

Referring to the figure, a fail-safe device 10, embodying the present invention is shown. Fail-safe device 10 is designed to remove or lockout power from controlled circuitry 12 upon the occurence of an undesired operating condition such as a functional error of the computer 14 which is used to regulate circuitry 12. Other undesired operating conditions may be determined according to the circuitry which is being controlled and are reported to the computer 14 over line 13. For instance, in the case where the controlled circuitry is operating a furnace, lockout may be caused if there is a momentary false flame during start-up, or if the air flow switch opens during the firing cycle, or if the flame fails during the firing cycle, or if other safety and confidence tests are failed. If the fail-safe device is being used to regulate a burner control system, the controlled circuitry 12 could include fuel valve solenoids for the purpose of regulating the supply of fuel to a burner.

Fail-safe device 10 is comprised of means 16 for generating a fail-safe signal and power control means 18 for supplying power to the circuitry 12 to be controlled. Means 16 generates a fail-safe signal which normally varies between signal levels at a frequency in a predetermined range between a maximum and a minimum frequency value, unless there is an undesired operating condition. Power control means 18 is responsive to the output of means 16 for supplying power to controlled circuitry 12 only when the fail-safe signal has a frequency in the predetermined range.

Means 16 includes computer 14 which generates a sequence of binary bits in which a predetermined pattern of bits appears at a frequency within a range corresponding to the predetermined range of the fail-safe signal unless there is an undesired operating condition detected in computer 14. Means 16 also includes comparator means 20 for receiving the sequence of binary bits produced by computer 14, for repeatedly comparing that sequence with a reference pattern, and for generating an output which varies in signal level in response to a match between the sequence and the reference pattern.

Power control means 18 includes an electromechanical relay 22 for supplying power to controlled circuitry 12. Relay 22 includes a solenoid 24 and normally open mechanical relay contacts 28 and 30 which remain open unless a sufficient current is supplied to solenoid 24 to close the gap between those two contacts. Power control means 18 also includes a relay actuating means 32 which has low-pass means 38 for transmitting only signal variations in the output of comparator means 20 which occur below the maximum frequency of the predetermined frequency range of the fail-safe signal. Actuating means 32 is designed to supply sufficient current to solenoid 24 to keep normally open contacts 28 and 30 closed only when both of the following conditions are met (1) power is supplied to power terminals 34 and 36, and (2) the output of the comparator means 20 as determined by computer 14 has a frequency in the proper predetermined range. Solenoid 24 will not receive sufficient current to close contact 28 and 30 unless an appropriate frequency signal is fed into low pass means 38. Power control means 18 also includes reset means 44 to allow a user to manually press a reset button which indicates to the computer 14 that the lockout, should be terminated. The computer 14 will terminate the lockout if the reset button 43 is momentarily depressed. If however the button jams or is held for an extended period of time the computer will maintain lockout by refusing to generate the fail-safe signal within the proper frequency range. This aspect of the present invention makes the fail-safe device substantially immune to user tampering.

Computer 14 is based around a microprocessor 46, which in the presently preferred embodiment is an 80C39. Computer 14 also includes a random access memory 48(RAM), a non-volatile memory 49, a read only memory 50(ROM), a parallel I/0 port 52, and a serial I/0 port 54 used to interface computer 14 to a display 55. Microprocessor 46, RAM 48, non-volatile memory 49, ROM 50, parallel I/0 port 52 and serial I/0 port 54 are all interconnected via a data bus 56 and an address and control bus 58. I/O port 52 is preferably an 81C55. Data bus 56 enables 8 bit parallel data segments, called bytes to be communicated between microprocessor 46 and any of the other components which are connected to that data bus. Address and control bus 58 enables microprocessor 46 to address the various devices to which that bus is connected and it enables control signals to be passed between the microprocessor and the other components which are connected to bus 58. A power line interrupt 60 is connected to microprocessor 46. The power line interrupt includes a transformer which receives the power signals over the AC power line. The received signals are full wave rectified and during normal 60 hertz operation of the power, the power line interrupt sends a pulse to the microprocessor 46 every 8.3 milliseconds. If the AC power is cut off the power line interrupt 60 will stop sending signals to the microprocessor and the microprocessor will immediately cause the information stored in non-volatile memory 49 to be permanently saved. The non-volatile memory 49 acts as a shadow memory storing the same information as the RAM 48. Therefore, all pending information will be saved even through a power outage. A clock 59 which includes an oscillating crystal provides timing pulses to the microprocessor 46.

Microprocessor 46 feeds a successive data bit of a three bit pattern "011" to a data line 62 every 8.3 milliseconds, unless an undesired operating condition is detected in the performance of the computer 14. Microprocessor 46 also sends a brief strobe pulse out on a strobe line 64 during the period that each of the data bits is on data line 62. Thus, during normal operation, computer 14 continuously sends a sequence of strobed data bits having a repeated pattern of "011" to the input of comparator means 20.

Comparator means 20 includes a shift register 66 and a comparator circuit 68. Shift register 66 has a serial data input connected to data line 62 and a strobe input connected to strobe line 64. This enables any value on data line 62 to be shifted into shift register strobe 66 whenever a strobe pulse is present on line 64. Shift register 66 is a four-bit shift register and it has a four-bit parallel output. Comparator 68 is a four-bit comparator and it has two four-bit parallel inputs, one of which is supplied with a hard wired reference pattern containing the bits "0110". This hard wired reference pattern is supplied to comparator 68 by connecting the first and last bits of its reference input to ground and the middle two bits of that reference input to a positive logic voltage. The other four-bit input of comparator 68 is connected to the four-bit output of shift register 66. The output of comparator 68, which is the failsafe signal, has a high logic level only when all of the four inputs received from shift register 66 match their corresponding bits in the hard wired referenced pattern "0110". Thus when, computer 14 supplies bits from the repeated sequence "011" at a rate of one bit every 8.3 milliseconds to shift register 66, the pattern in that shift register will be "0110" every twenty-five millisecond. As a result, during normal operation, the fail-safe signal generated by comparator 68 varies between a low and a high logic level once every twenty-five milliseconds.

The output of comparator 68 is connected to low-pass means 38 of relay actuating means 32. Low-pass means 38 is comprised of a photoresistive optocoupler which has two circuit paths, an input circuit path connecting the output of comparator 68 to +5 volts and containing a light emitting diode which emits light each time the output of comparator 68 goes to a high logic level, and an output path which is connected as part of the circuitry of relay actuating circuit 32 and which varies from its normal high impedance state to a low impedance state when the light emitting diode of the optocoupler's input paths emits radiation. However, it should be noted that the frequency response of the optocoupler 38 is limited. Once the frequency at which the light emitting diode of that optocoupler is turned on and off increases to over 40 cycles per second, the frequency at which its output path changes from a high to a low impedance state actually starts to drop, and if the frequency of the signal applied to the input path of the optocoupler rises above 80 cycles per second, the frequency at which the impedance of the output path varies is substantially reduced.

Relay actuating means 32 includes a means for maintaining a voltage across operating solenoid 24 to close switch 28 in response to the fail-safe signal level variations which are supplied to the optocoupler 38. The signal from the optocoupler 38 is fed into an amplifier stage comprising comparator amplifier 76. The output of the amplifier stage triggers transistors 90 and 94 in a push-pull mode. Resistors 78, 80, 84 and 86 and diode 82 set the operating thresholds of the transistors 90 and 94. When the input to optocoupler 38 is low, transistor 90 is on and transistor 94 is off. Thus, when the input to optocoupler 38 is low, capacitor 104 is charged through transistor 90, resistor 92 and diode 98 with a time constant determined primarily by resistor 92 and capacitor 104. This time constant is selected so that capacitor 104 will be fully charged by the time the input at optocoupler 38 changes to a high signal. Meanwhile, capacitor 100 is discharging through solenoid 24 when the input to optocoupler 38 changes to a high signal, transistor 94 is turned on and transistor 90 is turned off. Capacitor 104 then discharges through the solenoid 24, the diode 96 and transistor 94 while capacitor 100 is being fully charged. Thus, as the input to optocoupler 38 changes at a frequency within the fail-safe range, a voltage is maintained across solenoid 24. if a component within relay actuating means 32 should fail, the push-pull action on the transistors will be lost and the circuit will fail to produce a voltage across solenoid 24 sufficient to keep contacts 28 and 30 closed. The relay 22 will return to the safe state with contacts 28 and 30 open. The controlled circuitry 12 senses the loss of power caused by the opening of contacts 28 and 30 and the computer 14 is informed of the component failure via line 13.

Reset means 44 is designed to terminate a lockout condition when the reset button 43 is manually actuated. Microprocessor 46 indicates through display 55 what the cause of a lockout is. Once the cause has been remedied it will be desirable to terminate a lockout condition by pressing reset button 43. This will cause current to be drawn across resistor 110 and through the diode of optocoupler 108. This turns on the transistor in the optocoupler 108, pulling current through resistor 112 and sending line 114 to ground. This low signal is transmitted on line 114 to the computer 14. When the button 43 is released the optocoupler 108 stops conducting and line 114 returns to the 5 volt high signal. The computer 14 is programmed to resume generating the fail-safe signal when it receives a momentary low signal on line 114. If the low signal is received for an extended period of time, the computer 114 will record this as an undesirable operating condition and return to lockout.

During the initial power up, it is desirable to lockout power from the controlled circuitry 12 if there is a short circuit within the controlled circuitry itself. Short circuit detection means 120 is provided to cause a lockout in such circumstances. The power to the controlled circuitry 12 passes through heat limiting means comprising an inrush current limiting device 122 which initially has a resistance for limiting the initial surge current. This resistance is significantly decreased as the device 122 heats up. This reduces the power used by device 122 during a short circuit, thereby reducing the heat being produced to prevent heat damage to the circuitry. The presently preferred inrush current limiting device is a SURGE-GUARD TM, manufactured by Ametek, a division of Rodan having an initial resistance of 2.8 ohms. The heat limiting means is connected in parallel with capacitor 126 and current sensing means 128. Capacitor 126 acts to suppress spikes. Current sensing means 128 is comprised of a bidirectional optocoupler that acts as a shunt.

When the solenoid 24 closes contacts 28 and 30 to initially apply the AC power to the controlled circuitry 12, an initial surge of current is sent through current limiting device 122. Excess current is shunted through optocoupler 128, turning on the transistor within the optocoupler. This sends line 124 from 5 volts to ground. The low signal is sent to the parallel I/0 52 to indicate that a large amount of current is going through current limiting device 122. Upon receiving the signal the microprocessor 46 begins a timer. The timer measures a predetermined amount of time which is slightly larger than the normal current spike produced by turning on the power. If upon the expiration of the predetermined time period, the microprocessor is still receiving a low signal from line 124, it will discontinue the generation of the fail-safe signal into the relay actuating means 32 in order to lock out the power. The microprocessor 46 will also store data in RAM 48 indicating that the cause of the lockout was a short in controlled circuitry 12 and display an indication of the cause on the display 55. The data is also stored in non-volatile memory 49 which is acting as a shadow of RAM 48. Under normal conditions, when there is not a short circuit, the input surge will terminate within the predetermined time period. The current will reduce to an amount insufficient to activate optocoupler 128. As current limiting device 122 cools down it will return to its original resistance.

According to a further aspect of the present invention, test line 130 is provided so that the computer 14 can test the short circuit detection means 120 prior to generating a fail-safe signal to close contacts 28 and 30. A test is performed by sending a voltage on line 130 which is connected to the base of the transistor of the optocoupler 128. If the transistor is operative it will cause a low signal to be sent back to the computer 14 on line 124. This test enhances the integrity of the short circuit protection.

The non-volatile memory 49 of the present invention is preferably electrically alterable read only memory (EAROM). The non-volatile memory 49 acts as a shadow of RAM 48, making a duplicate copy of the data stored in RAM 48. If there is a power outage, the microprocessor 46 will find out immediately when power line interrupt 60 fails to produce an expected pulse. In the preferred embodiment, the power outage will be recognized if a pulse is not received within 20 milliseconds of the previous pulse. Power is still available for about 50 milliseconds because of voltage stored by capacitance in the circuitry. When power line interrupt 60 fails to produce a pulse, a microprocessor 46 performs a routine which causes the data stored in non-volatile memory 49 to be made permanent so that it is not lost during the power outage. The microprocessor 46 then sends a one second pulse to all of the integrated circuits in means 16 to reset them. Thus, upon return of the power the microprocessor 46 will start fresh with the preserved data in non-volatile memory 49.

A series of data is recorded in memory which may be used upon investigations of accidents. Information such as the number of ignition cycles, the hours of running, the reasons for lockouts, a running total of lockouts and other information useful in diagnosing the cause of a failure. Since this non-volatile 49 memory cannot be erased during a power outage, this valuable information is preserved for investigatory purposes. In addition, any time a power outage is recognized by the microprocessor through the power line interrupt 60 the status of the relay 22 is immediately preserved in the non-volatile memory 49 so that upon the return of the power, if the relay 22 was locked out it will remain locked out upon power return.

It should be understood that many varied embodiments of the present invention are possible. For example, a hard wired circuit could be used as means for generating the sequence of binary bits supplied to shift register 66 rather than the computer 14. It should also be understood that means 16 for generating the fail-safe signal could include analog circuitry for generating an analog fail-safe signal, rather than the digital circuitry shown in FIG. 1. In addition, it should be clear that other types of low-pass means could be used in the relay actuating means other than the photo-resistive optocoupler described above.

Thus, there has been described above a new and improved fail-safe device having significant advantages over previous devices used in the prior art for regulating circuitry to be controlled. It should be appreciated that modifications to the described embodiment may be made by those of ordinary skill applying the principles of the present invention to different applications. Accordingly, the present invention should not be considered to be limited by the description herein of the preferred embodiment, but rather should be interpreted in accordance with the following claims.

We claim:

1. A fail-safe device for removing power, supplied by a power line, from circuitry to be controlled upon occurrence of an undesired operating condition, said device comprising:
    means for generating a fail-safe signal which normally varies between signal levels at a frequency in a predetermined range between a minimum and a maximum frequency unless there is an undesired operating condition;
    power control means, connected to said generating means, for supplying power to said controlled circuitry only when the output of said generating means has a frequency in said predetermined range;
    heat limiting means, connected in series between said power control means and said controlled circuitry, having a resistance that is significantly reduced when a high current heats said heat limiting means;
    shunt means, connected in parallel with said heat limiting means for receiving current when a high current passes through said heat limiting means and for sending a signal to said generating means in response to receiving said high current; and
    said generating means including timer means initiated by a signal from said shunt means for counting a predetermined period of time so that upon expiration of said predetermined period of time, an undesired operating condition is indicated if a signal is still being received from said shunt means.

2. The fail-safe device of claim 1 wherein said generating means comprises:
    a programmable computing means for controlling said controlled circuitry, said computing means having memory means containing bit-transmit instructions for causing said computing means to generate a sequence of binary bits in which a predetermined pattern of bits appears at a frequency within a range corresponding to said predetermined range unless there is an undesired operating condition; and
    comparator means for receiving said sequence of binary bits, for repeatedly comparing said sequence with a predetermined pattern, and for generating an output which varies in signal level in response to a match between said sequence and said predetermined pattern.

3. The fail-safe device of claim 2 wherein said computing means further includes non-volatile memory means for storing the time and cause of each undesired operating condition.

4. The fail-safe device of claim 3 wherein said generating means further comprises a power line interrupt means for sending a pulse to said computing means every time the power line completes a half-cycle.

5. The fail-safe device of claim 4 wherein said computing means causes the contents of said non-volatile memory means to be preserved through a power outage when said computing means fails to receive a pulse expected from said power line interrupt means.

6. The fail-safe device of claim 1 further comprising manually activated reset means for sending a signal to said generating means so that after an undesired operating condition occurs, said generating means resumes generating a fail-safe signal which varies between signal levels at a frequency within said predetermined frequency range.

7. The fail-safe device of claim 6 wherein an undesired operating condition is caused by a signal from said reset means which persists for more than a predetermined time period.

8. The fail-safe device of claim 1 wherein said heat limiting means comprises an inrush current limiting device.

9. The fail-safe device of claim 1 wherein said shunt means comprises an optocoupler.

10. The fail-safe device of claim 9 further comprising a test line connecting said generating means and said optocoupler so that said optocoupler can be tested prior to the generation of a fail-safe signal.

11. A fail-safe device for removing power from circuitry to be controlled upon occurrence of an undesired operating condition, said device comprising:
    programmable computing means for controlling said circuitry to be controlled, said computing means including memory means containing bit-transmit instructions for causing said computing means to generate as an output a sequence of binary bits in which a predetermined pattern of bits appears at a frequency within a range corresponding to a predetermined frequency range unless there is an undesired operating condition and non-volatile memory means for storing data indicating whether an undesired operating condition exists, what time each undesired operating condition exists, what time each undesired operating condition occurred and what was the cause of each undesired operating condition;
    comparator means for receiving said sequence of binary bits, for repeatedly comparing said sequence with a reference pattern, and for generating an output which varies in signal level in response to a match between said sequence and said reference pattern;
    power control means responsive to the output of said comparator means for supplying power to said circuitry to be controlled only when said output of said comparator means has a frequency in said predetermined frequency range; and manually activated reset means for sending a signal to said computing means after an undesired operating condition occurs so that said computing means resumes generating a sequence of binary bits in which said predetermined pattern of bits appears at a frequency within said predetermined frequency range, said reset means causing an undesired operating condition if it sends a signal which persists for more than a predetermined time period.

12. The fail-safe device of Claim 11 further comprising power line interrupt means for sending a pulse to said computing means every time the power line completes a half cycle and wherein said computing means causes the contents of said non-volatile means to be preserved through a power outage when said computing means fails to receive said pulse expected from said power line interrupt means, so that upon return of power said computing means will determine from said non-volatile memory means whether an undesired operating condition has occurred and has not been reset.

13. The fail-safe device of claim 11 further comprising short circuit detection means, connected between said power control means and said circuitry to be controlled, for indicating an undesired operating condition when a short circuit is detected in said circuitry to be controlled.

14. A fail-safe device for removing power from circuitry to be controlled upon occurrence of an undesired operating condition, said device comprising:

programmable computing means for controlling said circuitry to be controlled, said computing means including memory means containing bit-transmit instructions for causing said computing means to generate as an output a sequence of binary bits in which a predetermined pattern of bits appears at a frequency within a range corresponding to a predetermined frequency range unless there is an undesired operating condition and non-volatile memory means for storing data indicating whether an undesired operating condition exists, what time each undesired operating condition occurred and what was the cause of each undesired operating condition;

comparator means for receiving said sequence of binary bits, for repeatedly comparing said sesquence with a reference pattern, and for generating an output which varies in signal level in response to a match between said sequence and said reference pattern;

power control means responsive to the output of said comparator means for supplying power to said circuitry to be controlled only when said output of said comparator means has a frequency in said predetermined frequency range;

heat limiting means for indicating an undesired operating condition when a short circuit is detected in said circuitry to be controlled, said heat limiting means being connected in series between said power control means and said circuitry to be controlled and having a resistance that is significantly reduced when a high current heats said heat limiting means;

shunt means, connected in parallel with said heat limiting means, for receiving current when a high current passes through said heat limiting means for receiving current when a high current passes through said heat limiting means and for sending a signal to said computing means in response to receiving said high current; and said computing means including timer means initiated by a signal from said shunt means for counting a predetermined period of time, so that upon expiration of said predetermined period of time an undesired operating condition is indicated if a signal is still being received from said shunt means.

15. The fail-safe device of claim 14 wherein said heat limiting means comprises an inrush current limiting device.

16. The fail-safe device of claim 14 wherein said shunt means comprises an optocoupler.

17. The fail-safe device of claim 16 further comprising a test line connecting said computing means and said optocoupler so that said optocoupler can be tested prior to the supplying of power to said circuitry to be controlled.

18. A fail-safe device for removing power, supplied by a power line, from circuitry to be controlled upon occurrence of an undesired operating condition, said device comprising:

means for generating a fail-safe signal which normally varies between signal levels at a frequency in a predetermined range between a minimum and a maximum frequency unless there is an undesired operating condition, said generating means including non-volatile memory means for storing data indicating whether an undesired operating condition exists, what time each undesired operating condition occurred and what was the cause of each undesired operating condition;

power line interrupt means for sending a pulse to said generating means every time said power line completes a half-cycle;

said generating means causing the data stored in said non-volatile memory to be preserved through a power outage when an expected pulse is not received from said power line interrupt means;

power control means connected to said generating means and responsive to the output of said generating means for supplying power to said circuitry to be controlled only when said output of said generating means has a frequency in said predetermined range;

short circuit detection means for indicating the existence of an undesired operating condition upon detection of a short circuit in said circuitry to be controlled; and manually activated reset means for sending a signal to said generating means so that after an undesired operating condition occurs, said generating means resumes generating a fail-safe signal which varies between signal levels at a frequency within said predetermined frequency range and wherein an undesired operating condition is caused by a signal from said reset means which persists for more than a predetermined time period.

19. A fail-safe device for removing power, supplied by a power line, from circuitry to be controlled upon occurrence of an undesired operating condition, said device comprising:

means for generating a fail-safe signal which normally varies between signal levels at a frequency in a predetermined range between a minimum and a maximum frequency unless there is an undesired operating condition, said generating means including non-volatile memory means for storing data indicating whether an undesired operating condition exists, what time each undesired operating condition occurred and what was the cause of each undesired operating condition;

power line interrupt means for sending a pulse to said generating means every time said power line completes a half-cycle;

said generating means causing the data stored in said non-volatile memory to be preserved through a power outage when an expected pulse is not viewed from said power line interrupt means;

power control means connected to said generating means and responsive to the output of said generating means for supplying power to said circuitry to be controlled only when said output of said generating means has a frequency in said predetermined range;

short circuit detection means for indicating the existence of an undesired operating condition upon detection of a short circuit in said circuitry to be controlled wherein said short circuit detection means comprises:

heat limiting means, connected in series between said power control means and said circuitry to be controlled, having a resistance that is significantly reduced when a high current heats said heat limiting means;

means for sensing when a high current passes through said heat limiting means and for sending a signal to said generating means in response to sensing said high current; and said generating means including timer means initiated by a signal from said current sensing means for counting a predetermined period of time, so that upon expiration of said predetermined period of time an undesired operating condition is indicated if a signal is still being received from said current sensing means.

20. The fail-safe device of claim 19 wherein said current sensing means comprises a bidirectional optocoupler connected in parallel with said heat limiting means.

21. The fail-safe device of claim 20 further comprising a test line connecting said generating means and said optocoupler so that said optocoupler can be tested prior to the supplying of power to said circuitry to be controlled.

* * * * *